United States Patent
Chen (10) Patent No.: US 10,576,549 B2
(45) Date of Patent: Mar. 3, 2020

(54) HOT AIR ARBOR HEATER

(71) Applicant: Chih Hsiang Chen, Taichung (TW)

(72) Inventor: Chih Hsiang Chen, Taichung (TW)

(*) Notice: Subject to any disclaimer, the term of this patent is extended or adjusted under 35 U.S.C. 154(b) by 350 days.

(21) Appl. No.: 15/814,002

(22) Filed: Nov. 15, 2017

(65) Prior Publication Data

US 2019/0143420 A1  May 16, 2019

(51) Int. Cl.
| | |
|---|---|
| *B23B 29/22* | (2006.01) |
| *B23B 27/12* | (2006.01) |
| *B23P 11/02* | (2006.01) |
| *F24H 3/02* | (2006.01) |

(52) U.S. Cl.
CPC .............. *B23B 29/22* (2013.01); *B23B 27/12* (2013.01); *B23P 11/027* (2013.01)

(58) Field of Classification Search
None
See application file for complete search history.

(56) References Cited

U.S. PATENT DOCUMENTS

| | | | | | |
|---|---|---|---|---|---|
| 2,609,477 | A | * | 9/1952 | Borda | B29C 73/305 |
| | | | | | 392/383 |
| 3,349,478 | A | * | 10/1967 | De Jean | H02K 15/028 |
| | | | | | 29/598 |
| 3,405,024 | A | * | 10/1968 | Attwood | B29C 65/08 |
| | | | | | 156/73.1 |
| 3,579,805 | A | * | 5/1971 | Kast | B23P 11/025 |
| | | | | | 148/529 |
| 3,621,550 | A | * | 11/1971 | Colestock | B23P 11/025 |
| | | | | | 29/888.44 |
| 3,725,994 | A | * | 4/1973 | Wechsler | B21B 28/02 |
| | | | | | 29/447 |
| 3,872,573 | A | * | 3/1975 | Nichols | B21D 41/02 |
| | | | | | 29/447 |
| 4,083,272 | A | * | 4/1978 | Miller | B23Q 1/28 |
| | | | | | 33/638 |
| 4,620,350 | A | * | 11/1986 | Thurber | H01B 19/00 |
| | | | | | 29/235 |
| 5,309,545 | A | * | 5/1994 | Spigarelli | B23K 1/0053 |
| | | | | | 219/85.12 |
| 5,394,505 | A | * | 2/1995 | Bidare | C03B 33/09 |
| | | | | | 156/497 |
| 6,201,930 | B1 | * | 3/2001 | Close | H05K 13/0486 |
| | | | | | 228/191 |
| 6,871,013 | B2 | * | 3/2005 | Martinez | B29C 65/12 |
| | | | | | 156/575 |
| 2001/0025899 | A1 | * | 10/2001 | Bradshaw | B65H 75/242 |
| | | | | | 242/573.7 |
| 2005/0133277 | A1 | * | 6/2005 | Dixon | B23C 5/1009 |
| | | | | | 175/426 |

(Continued)

*Primary Examiner* — Thor S Campbell
(74) *Attorney, Agent, or Firm* — Birch, Stewart, Kolasch & Birch, LLP (57) ABSTRACT

A hot air arbor heater has a bottom plate, an arbor placing base, a support unit, a hot air gun assembly, and a cooling assembly. The bottom plate has an installation portion and an adjusting portion. The arbor placing base is mounted on the installation portion of the bottom plate. The support unit is mounted on the adjusting portion of the bottom plate. The hot air gun assembly is fixed to the support unit. The hot air gun assembly has a hot air gun and a heating hood. The hot air gun is fixed to the support unit. The heating hood is fixed to the hot air gun. The cooling assembly is fixed to the support unit.

16 Claims, 8 Drawing Sheets

(56) References Cited

U.S. PATENT DOCUMENTS

| | | | | |
|---|---|---|---|---|
| 2006/0098961 A1* | 5/2006 | Seutter | ............... | A47K 10/48 |
| | | | | 392/383 |
| 2009/0179368 A1* | 7/2009 | Haimer | ............... | B23B 31/1071 |
| | | | | 269/54.2 |
| 2011/0144649 A1* | 6/2011 | Victor | ............... | A61B 17/1617 |
| | | | | 606/80 |
| 2018/0369976 A1* | 12/2018 | Gosselin | ............... | B23B 29/04 |

* cited by examiner

HOT AIR ARBOR HEATER

BACKGROUND OF THE INVENTION

1. Field of the Invention

The present invention relates to an arbor heater, especially to a hot air arbor heater which can reduce the operational space of the arbor heater.

2. Description of Related Art

A cutter arbor has a mounting hole formed in a top surface of the cutter arbor. A diameter of the mounting hole is smaller than a diameter of a cutter. Therefore, when a cutter on the cutter arbor is to be replaced with another cutter, an electric arbor heater is needed. The electric arbor heater may increase the temperature of the cutter arbor, and thereby the mounting hole of the cutter arbor would get enlarged, so the user may change the cutter accordingly. After the cutter is replaced, the cutter arbor with the cutter is moved away from the heater and into a cooling system. The cooling system may cool down the cutter arbor; thereby the diameter of the mounting hole will get smaller, and the cutter may be installed in the mounting hole firmly.

However, when the conventional electric arbor heater is in use, the cutter arbor and the cutter have to be moved between the conventional electric arbor heater and the cooling system. The conventional electric arbor heater and the cooling system occupy much space, and the operational process is also inconvenient.

To overcome the shortcomings of the conventional arbor heater, the present invention provides a hot air arbor heater to mitigate or obviate the aforementioned problems.

SUMMARY OF THE INVENTION

The main objective of the present invention is to provide a hot air arbor heater, and more particularly, the hot air arbor heater can reduce the operational space.

The hot air arbor heater has a bottom plate, an arbor placing base, a support unit, a hot air gun assembly, and a cooling assembly. The bottom plate has an installation portion and an adjusting portion. The arbor placing base is mounted on the installation portion of the bottom plate. The support unit is mounted on the adjusting portion of the bottom plate. The hot air gun assembly is fixed to the support unit. The hot air gun assembly has a hot air gun and a heating hood. The hot air gun is fixed to the support unit. The heating hood is fixed to the hot air gun. The cooling assembly is fixed to the support unit.

Other objects, advantages, and novel features of the invention will become more apparent from the following detailed description when taken in conjunction with the accompanying drawings.

DETAILED DESCRIPTION OF PREFERRED EMBODIMENT

With reference to FIGS. 1 to 4, a hot air arbor heater in accordance with the present invention comprises a bottom plate 10, an arbor placing base 20, a support unit 30, a hot air gun assembly 40, and a cooling assembly 50.

The bottom plate 10 is an elongated plate and has a first end, a second end, an installation portion 11, and an adjusting portion 12. The installation portion 11 is formed at the first end of the bottom plate 10. The adjusting portion 12 is formed at the second end of the bottom plate 10. The adjusting portion 12 has an adjusting hole 121 formed through the bottom plate 10. The adjusting hole 121 is a transverse elongated hole.

The arbor placing base 20 is mounted on the installation portion 11 of the bottom plate 10. The arbor placing base 20 has a receiving hole 21. The receiving hole 21 is formed through a top surface of the arbor placing base 20, and a cutter arbor may be placed in the receiving hole 21.

Figure 1:
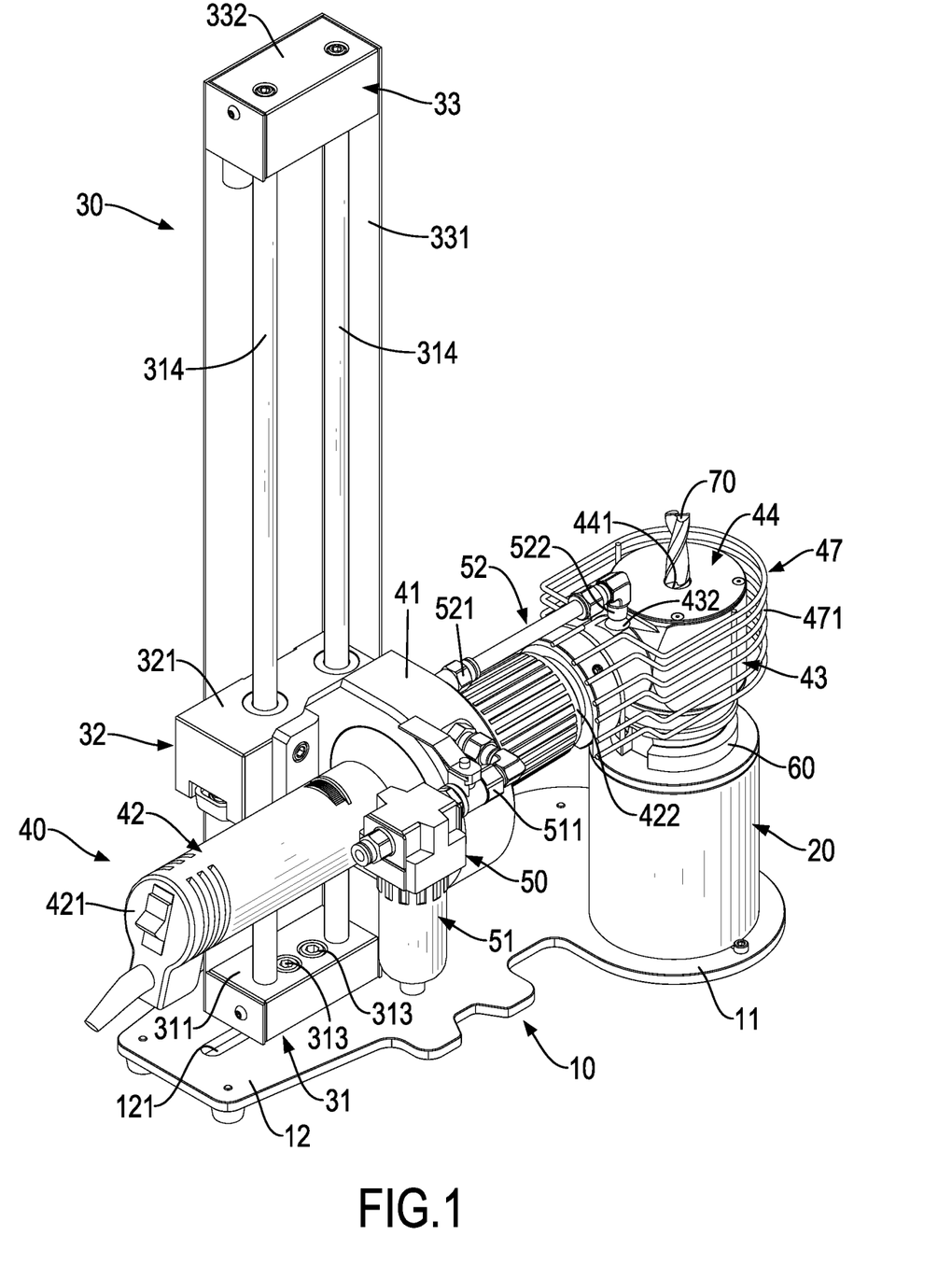
FIG. 1 is a perspective view of a hot air arbor heater in accordance with the invention.
Figure 3:
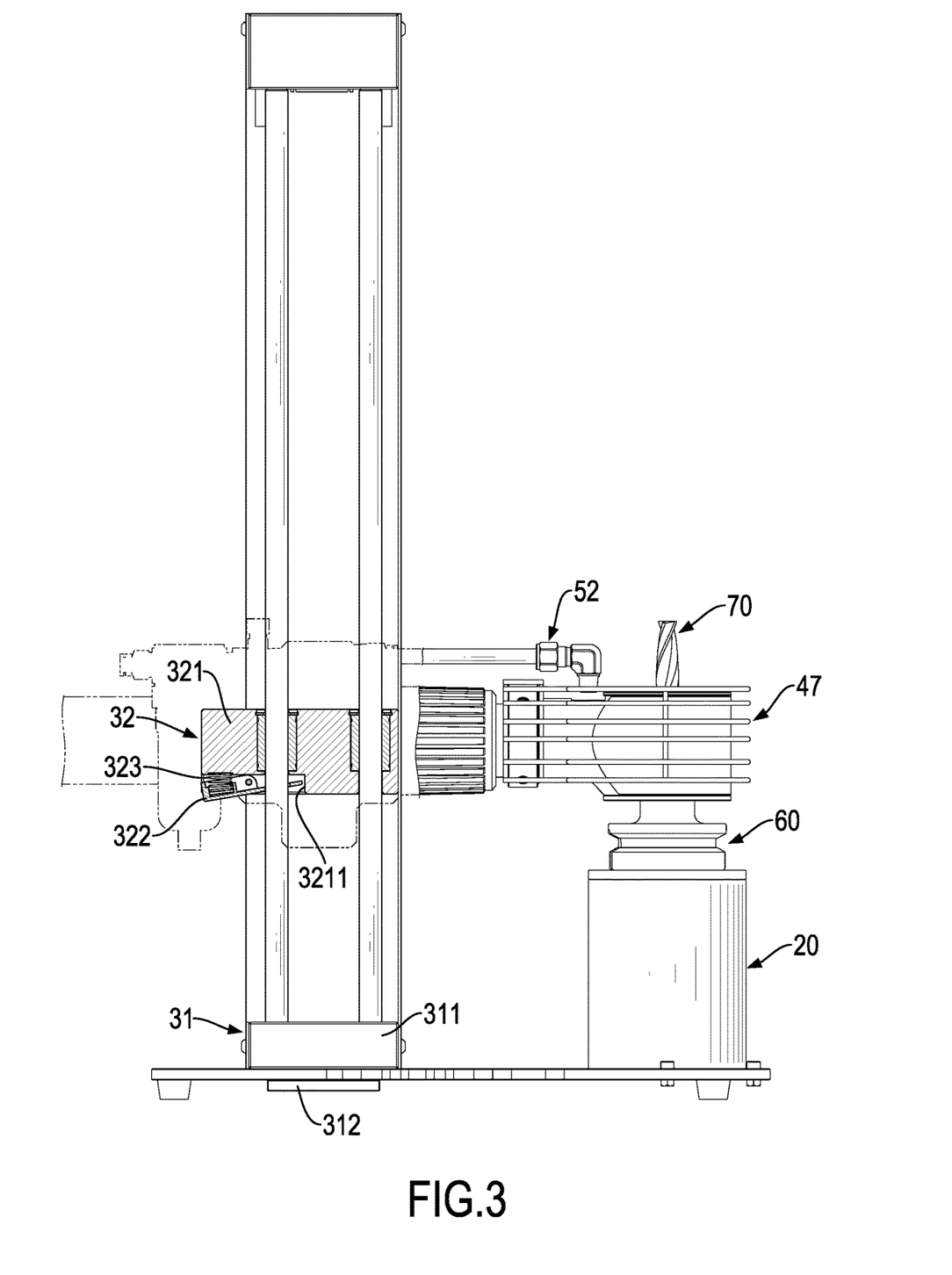
FIG. 3 is another front view in partial section of the hot air arbor heater in FIG. 1.

With reference to FIGS. 1 and 3, the support unit 30 is mounted on the adjusting portion 12 of the bottom plate 10. The support unit 30 has a moveable adjusting device 31, a main height adjusting device 32, and an auxiliary height adjusting device 33. The moveable adjusting device 31 is mounted through the adjusting hole 121 of the bottom plate 10, and the moveable adjusting device 31 may be transversely moved relative to the bottom plate 10. The moveable adjusting device 31 has a moving block 311, a join block 312, two fixing bolts 313, and two guide rods 314. The moving block 311 is mounted through the adjusting hole 121 of the bottom plate 10, and may be transversely moved relative to the bottom plate 10. The moving block 311 has two through holes 3111. The two through holes 3111 are formed through the moving block 311. The join block 312 abuts a bottom surface of the bottom plate 10, and is below the moving block 311. The join block 312 has two threaded holes 3121. The two threaded holes 3121 are formed through the join block 312. Each one of the two fixing bolts 313 is mounted through a respective one of the two through holes 3111, the adjusting hole 121, and a respective one of the two screw holes 3121. When the two fixing bolts 313 are released, the moving block 311 is movable relative to the adjusting hole 121 to adjust the position of the moveable adjusting device 31. The two guide rods 314 are mounted on a top surface of the moving block 311 at a spaced interval.

With reference to FIGS. 1 to 4, the main height adjusting device 32 is combined with the moveable adjusting device 31, and the main height adjusting device 32 is mounted around the two guide rods 314 of the moveable adjusting device 31. The main height adjusting device 32 has a sliding block 321, a clamp 322, and a spring 323. The sliding block 321 is mounted around the two guide rods 314 of the moveable adjusting device 31. The sliding block 321 has an abutting recess 3211. The abutting recess 3211 is formed in a bottom surface of the sliding block 321. The clamp 322 is mounted around one of the two guide rods 314. The clamp 322 is pivotally connected with the sliding block 321, and abuts a bottom surface of the abutting recess 3211. The spring 323 abuts between the bottom surface of the abutting recess 3211 and a top surface of the clamp 322. The abutting strength between the clamp 322 and the spring 323 and the pivoting relationship of the clamp 322 and the sliding block 321 make the clamp 322 inclined relative to the sliding block 321. The clamp 322 is mounted around one of the two guide rods 314 and frictionally abuts against said one of the guide rods 314, thereby the sliding block 321 is allowed to stop at a specific height with respect to the two guide rods 314.

Figure 4:
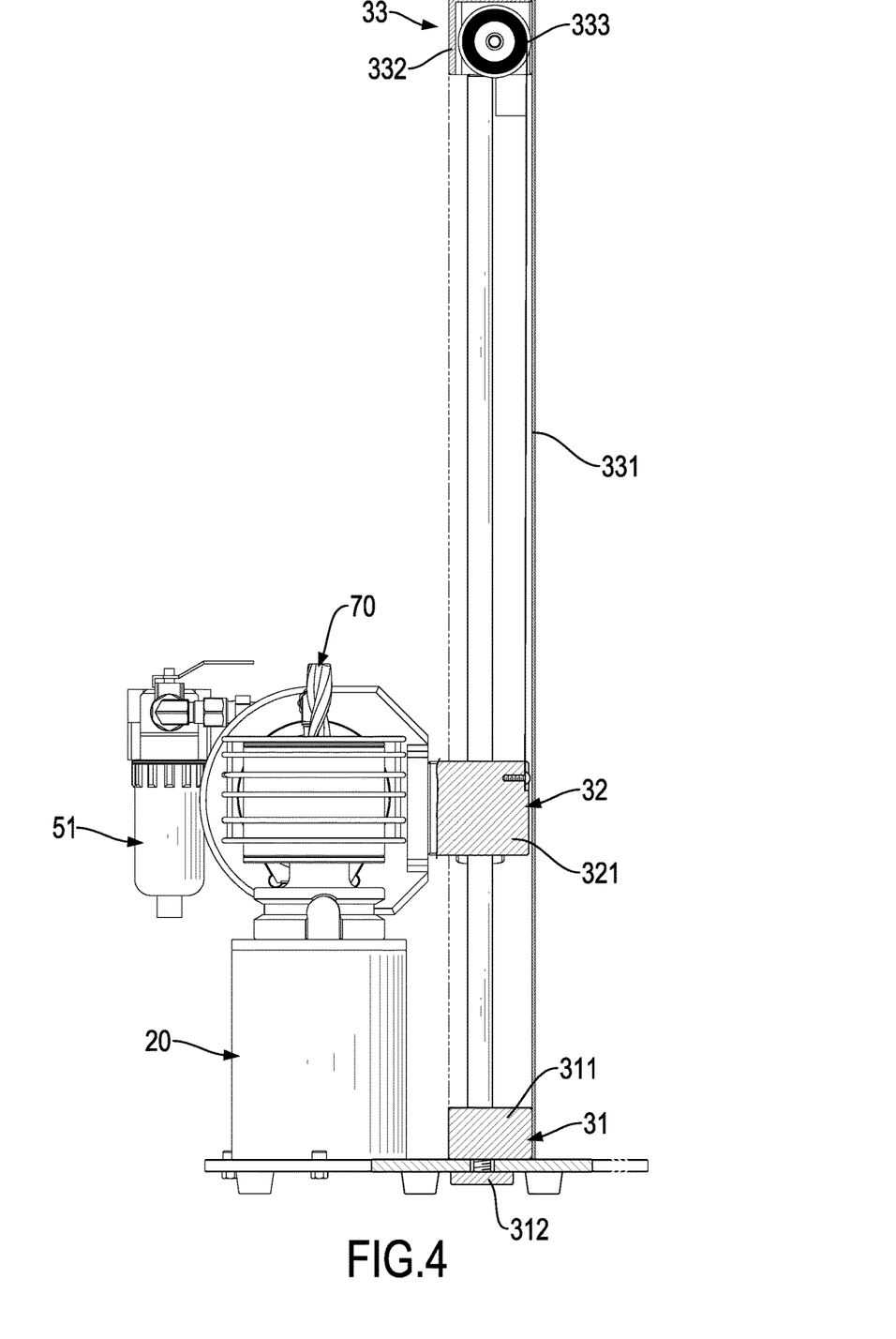
FIG. 4 is another front view in partial section of the hot air arbor heater in FIG. 1.
Figure 5:
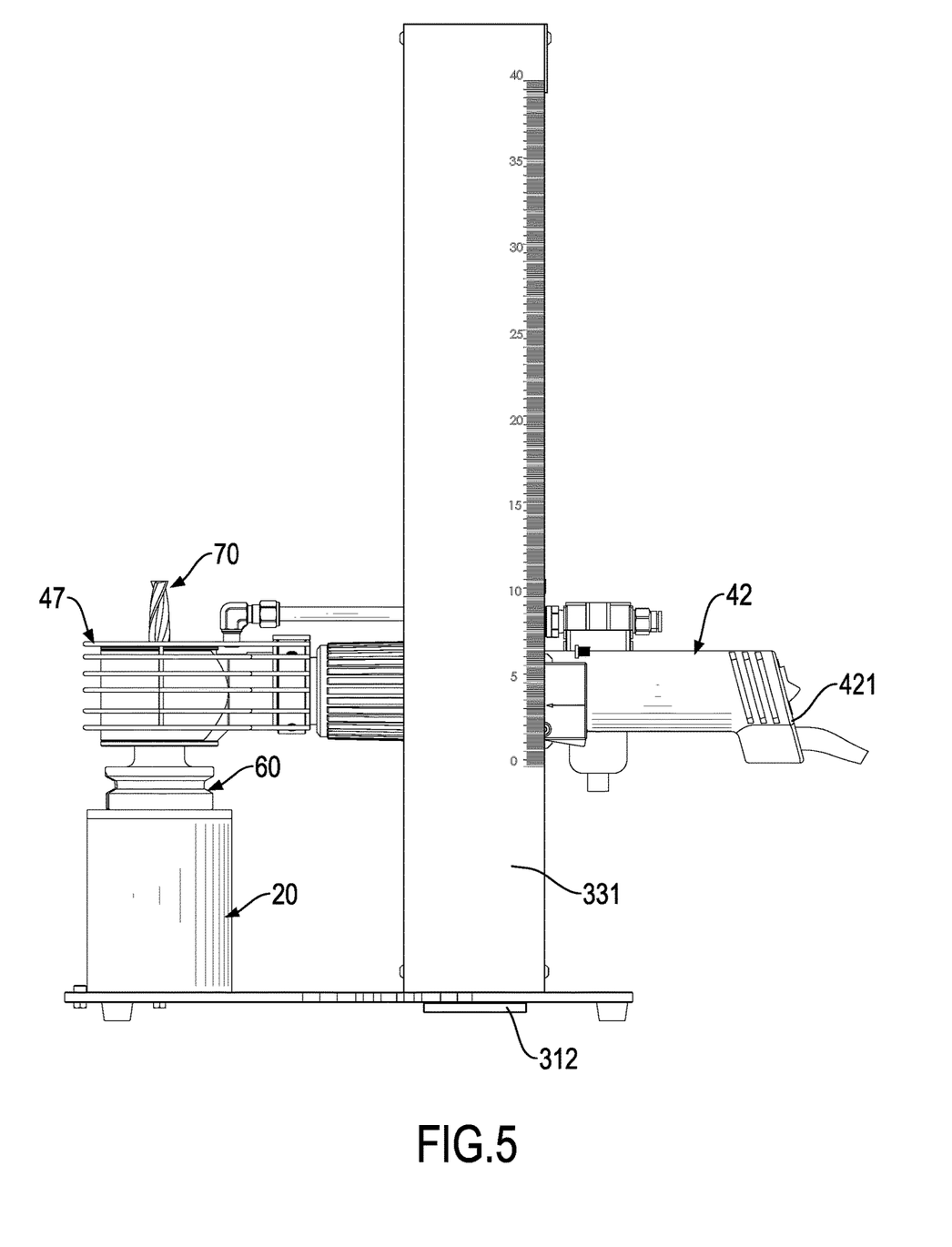
FIG. 5 is a rear front view of the hot air arbor heater in FIG. 1.

With reference to FIGS. 1, 4, and 5, the auxiliary height adjusting device 33 is connected to the sliding block 311 and the two guide rods 314. The auxiliary height adjusting device 33 has a shell 331, an assembly seat 332, and a constant force spring 333. The shell 331 is fixed to the moving block 311, and can be moved with the moving block 311 synchronously. The cross section of the shell 331 is L-shaped, and the shell 331 partly covers around the two guide rods 314. The assembly seat 332 is fixed to top ends of the two guide rods 314. The constant force spring 333 is pivotally connected to the inside of the assembly seat 332. The constant force spring 333 extends downwardly to be fixed to the sliding block 321 to allow the sliding block 321 to stop at a specific height relative to the two guide rods 314.

Figures 2, 2A:
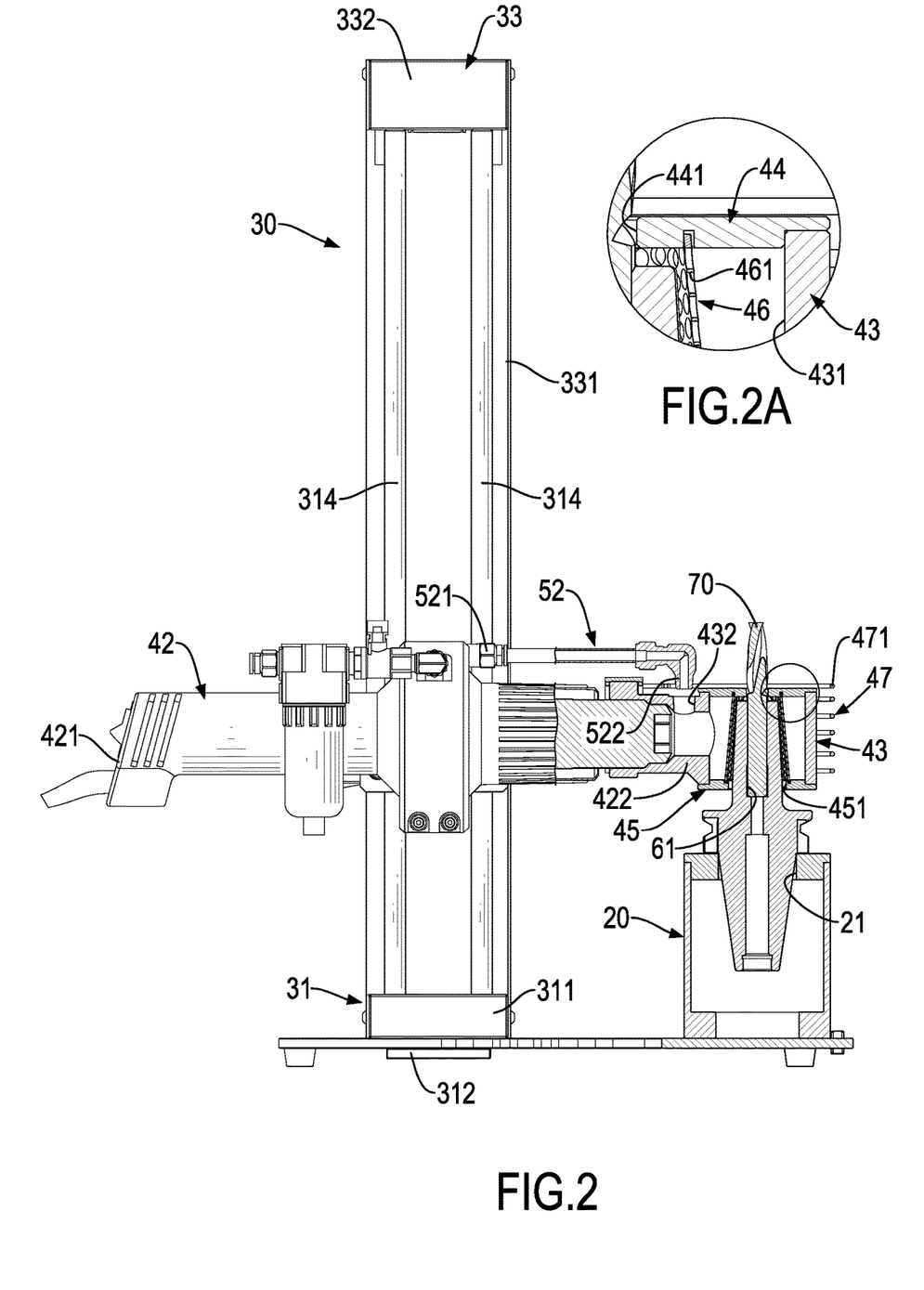
FIG. 2 is a front view in partial section of the hot air arbor heater in FIG. 1.
FIG. 2A is an enlarged front view in partial section of the hot air arbor heater in FIG. 2.

With reference to FIGS. 1 to 3, the hot air gun assembly 40 is fixed to the sliding block 321 of the main height adjusting device 32. The hot air gun assembly 40 has a fixed seat 41, a hot air gun 42, a heating hood 43, a heating upper cover 44, a heating lower cover 45, a vent cover 46, and a protective net 47. The fixed seat 41 is fixed to the sliding block 321, and is a circular seat. The hot air gun 42 is mounted through and fixed to the fixed seat 41, and has a hot air inlet end 421 and a hot air outlet end 422. The heating hood 43 is fixed to the hot air inlet end 421 of the hot air gun 42, and has a chamber 431 and an air flow inlet 432. The chamber 431 is formed inside the heating hood 43. The air flow inlet 432 is formed through a top portion of the heating hood 43. The air flow inlet 432 communicates with the chamber 431. The heating upper cover 44 and the heating lower cover 45 respectively cover a top end and a bottom end of the heating hood 43. The heating upper cover 44 has an upper through hole 441. The upper through hole 411 is formed through the heating upper cover 44, and a cutter can be placed in the upper through hole 441. The heating lower cover 45 has a lower through hole 451. The lower through hole 451 is formed through the heating lower cover 45, and a cutter arbor can be placed in the lower through hole 451. The vent cover 46 is mounted in the heating hood 43, and the vent cover 46 is a tapered cover. The peripheral surface of the vent cover 46 is provided with a plurality of venting holes 461. The protective net 47 is fixed to and mounted around the heating hood 43. The protective net 47 has multiple protective rods 471 arranged at evenly spaced intervals. The protective net 47 can prevent the user from touching the heating hood 43 to protect the user.

With reference to FIGS. 1 and 3, the cooling assembly 50 is fixed to the fixed seat 41 of the hot air gun assembly 40. The cooling assembly 50 has a filter 51 and a cooling tube 52. The filter 51 is fixed to the fixed seat 41, and has a guide tube 511. The purpose of the filter 51 is to filter moisture in the air. The cooling tube 52 is fixed to the fixed seat 41, and has a cool air inlet 521 and a cool air outlet 522. The cool air inlet 521 is fixed to the fixed seat 41 and communicates with the guide tube 511 of the filter 51. The cool air outlet 522 is above the air flow inlet 432 of the heating hood 43.

The air flow in the cooling tube 52 may flow into the chamber 431 of the heating hood 431 via the air flow inlet 432.

With reference to FIGS. 1 to 3, when the hot air arbor heater in accordance with the present invention is in use, a cutter arbor 60 is placed in the arbor placing base 20. The cutter arbor 60 has an installation hole 61. A cutter 70 can be placed in the installation hole 61 of the cutter arbor 60 via the upper through hole 441 of the heating upper cover 44. When the cutter arbor 60 is to be replaced with the cutter 70, the hot air gun 42 blows the hot air from the hot air outlet end 422 to the cutter arbor 60 via the vent cover 46. Since the vent cover 46 is tapered and has the multiple venting holes 461, the hot air can uniformly heat the cutter arbor 60. The installation hole 61 of the cutter arbor 60 is enlarged by thermal expansion and contraction. Then, the cutter 70 can be taken out from the installation hole 61 of the cutter arbor 60, and another cutter 70 can be inserted into the installation hole 61 of the cutter arbor 60. Furthermore, the cooling tube 52 of the cooling assembly 50 is operated to cool the cutter arbor so that the dry cold air cools the cutter arbor 60. Similarly, because of the principle of thermal expansion and contraction, the diameter of the installation hole 61 is reduced so that the other cutter 70 is securely attached to the cutter arbor 60.

For the conventional operator, it is necessary to move the cutter arbor 60 between the electric heating gas system and the cooling mechanism, which is inconvenient in the operation process. The electric heating gas system and the cooling mechanism also occupy much space. The hot air gun assembly 40 is combined with the cooling assembly 50 in the same machine so that the user does not have to move the cutter arbor 60 and also effectively saves space.

Figure 6:
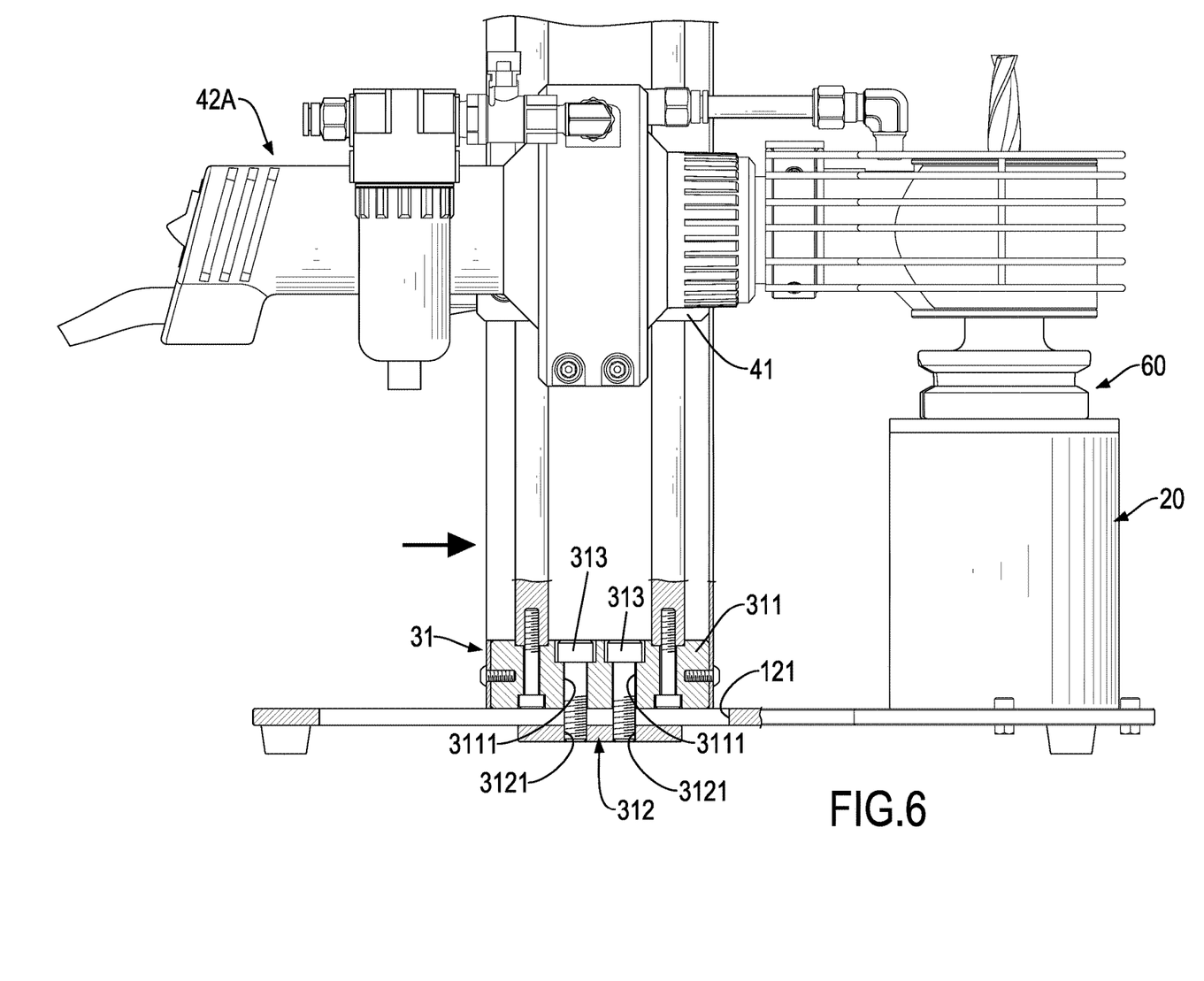
FIG. 6 is an operational front view in partial section of the hot air arbor heater in FIG. 1.
Figure 7:
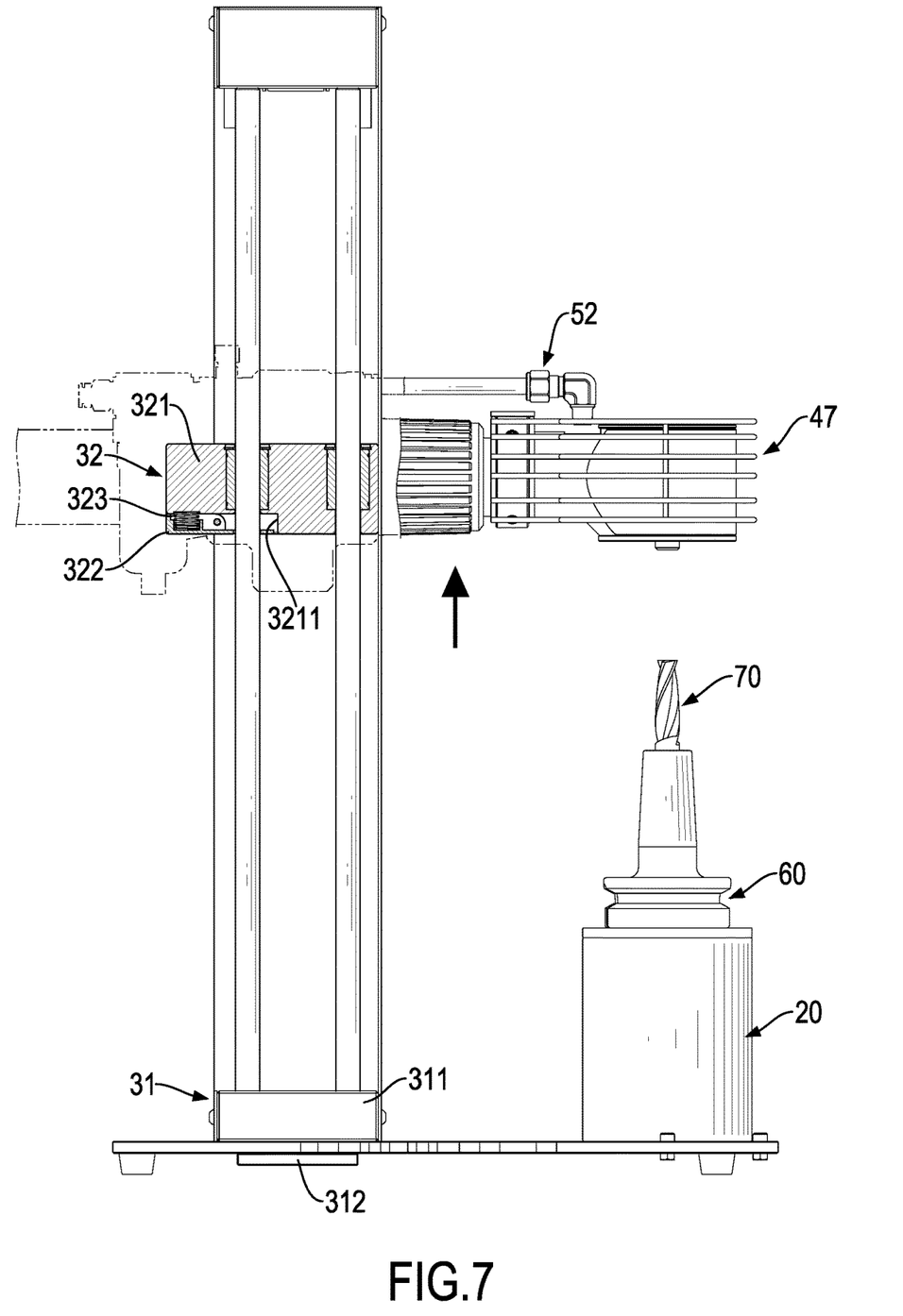
FIG. 7 is another operational front view in partial section of the hot air arbor heater in FIG. 1.
Figure 8:
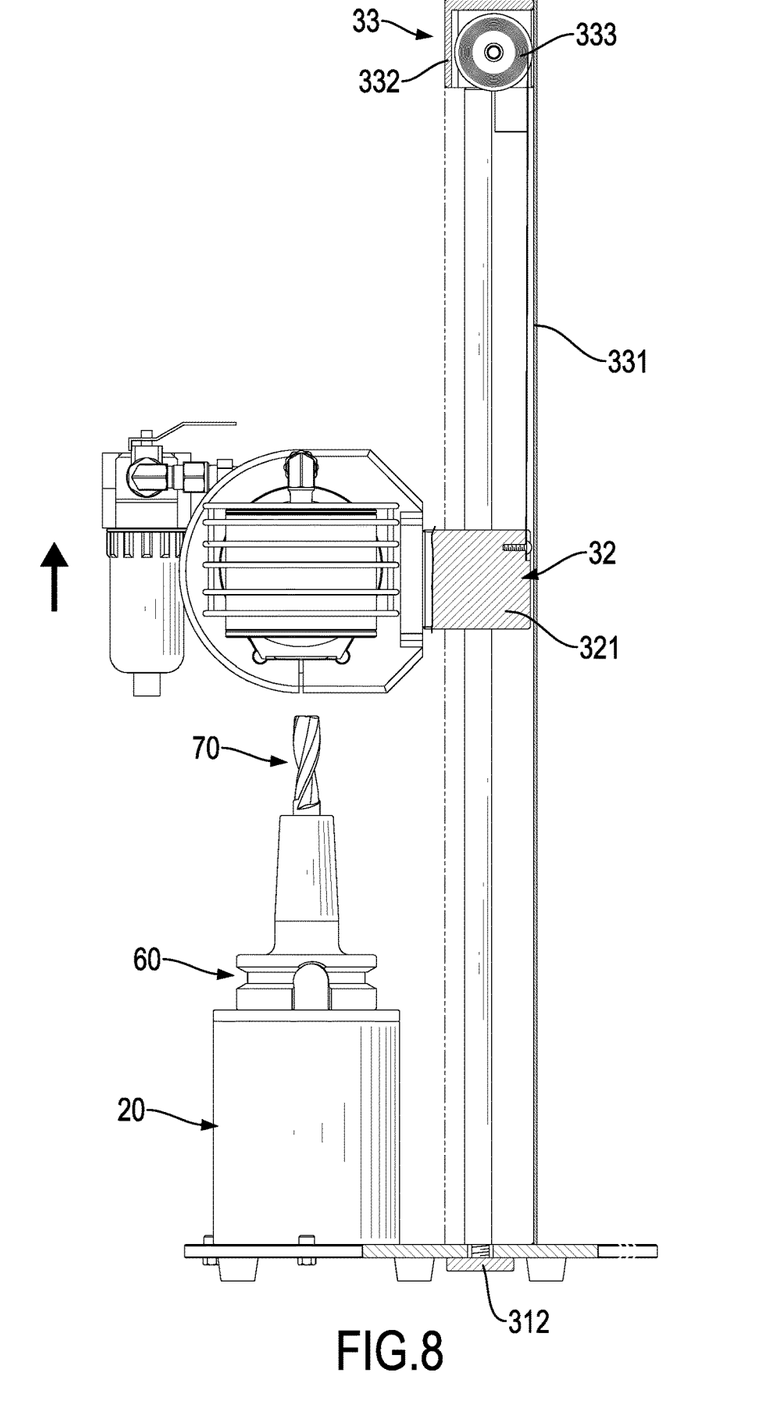
FIG. 8 is an operational side view in partial section of the hot air arbor heater in FIG. 1.

With reference to FIG. 6, to change to another hot air gun 42A of a different size, the two fixing bolts 313 are released. The moving block 311 may move relative to the adjusting hole 121 to adjust the position of the moveable adjusting device 31, and the distance between the arbor placing base 20 and the fixed seat 41 may be adjusted. Furthermore, with reference to FIGS. 7 and 8, to adjust the height of the cutter arbor 60, the user can press the clamp 322 upward so that the clamp 322 does not contact one of the guide rods 314 without friction and then pulls the spring 333 to adjust the height of the sliding block 321, and the height of the fixed seat 41 can be adjusted with the height of the cutter arbor 60.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A hot air arbor heater comprising:
   a bottom plate being an elongated plate and having
      a first end;
      a second end;
      an installation portion formed at the first end of the bottom plate; and
      an adjusting portion formed at the second end of the bottom plate;
   an arbor placing base mounted on the installation portion of the bottom plate;
   a support unit mounted on the adjusting portion of the bottom plate;

a hot air gun assembly fixed to the support unit and having
   a hot air gun fixed to the support unit and having
      a hot air inlet end; and
      a hot air outlet end;
   a heating hood fixed on the hot air outlet end of the hot air gun and having
      a chamber formed in the heating hood; and
      an air flow inlet formed through a top portion of the heating hood and communicating with the chamber; and
   a vent cover mounted in the heating hood, being a tapered cover, and having
      multiple venting holes formed through a peripheral surface of the vent cover; and
a cooling assembly fixed to the support unit and communicating with the chamber of the heating hood.

2. The hot air arbor heater as claimed in claim 1, wherein the cooling assembly has
   a filter mounted on the support unit and having
      a guide tube; and
   a cooling tube mounted on the support unit and having
      a cool air inlet communicating with the guide tube of the filter; and
      a cool air outlet being above the air flow inlet of the heating hood.

3. The hot air arbor heater as claimed in claim 2, wherein the adjusting portion has an adjusting hole formed through the bottom plate, the adjusting hole is a transverse elongated hole, and the support unit has a moveable adjusting device mounted through the adjusting hole of the bottom plate.

4. The hot air arbor heater as claimed in claim 3, wherein the moveable adjusting device has
   a moving block mounted through the adjusting hole of the bottom plate, being transversely moveable relative to the bottom plate, and having two through holes formed through the moving block;
   a join block abutting a bottom surface of the bottom plate and below the moving block, and having two threaded holes formed through the join block;
   two fixing bolts mounted through the two through holes respectively; and
   two guide rods mounted on a top surface of the moving block at a spaced interval.

5. The hot air arbor heater as claimed in claim 4, wherein the support unit has a main height adjusting device combined with the moveable adjusting device, and the main height adjusting device is mounted around the two guide rods.

6. The hot air arbor heater as claimed in claim 5, wherein the main height adjusting device has
   a sliding block mounted around the two guide rods of the moveable adjusting device, and having an abutting recess formed in a top surface of the sliding block;
   a clamp mounted around one of the two guide rods, pivotally connected to the sliding block, and abutting a bottom surface of the abutting recess; and
   a spring abutting between the bottom surface of the abutting recess and a top surface of the clamp.

7. The hot air arbor heater as claimed in claim 5, wherein the support unit has an auxiliary height adjusting device having
   a shell fixed to the moving block, and partly covering around the two guide rods;
   an assembly seat fixed to top ends of the two guide rods; and
   a constant force spring mounted in the assembly seat.

8. The hot air arbor heater as claimed in claim 6, wherein the support unit has an auxiliary height adjusting device having
   a shell fixed to the moving block, and partly covering around the two guide rods;
   an assembly seat fixed to top ends of the two guide rods; and
   a constant force spring pivotally connected to the inside of the assembly seat, and being stretchable to fix with the sliding block.

9. The hot air arbor heater as claimed in claim 1, wherein the hot air gun assembly has a protective net fixed to and mounted around the heating hood, and has multiple protective rods arranged at evenly spaced intervals.

10. The hot air arbor heater as claimed in claim 2, wherein the hot air gun assembly has a protective net fixed to and mounted around the heating hood, and has multiple protective rods arranged at evenly spaced intervals.

11. The hot air arbor heater as claimed in claim 3, wherein the hot air gun assembly has a protective net fixed to and mounted around the heating hood, and has multiple protective rods arranged at evenly spaced intervals.

12. The hot air arbor heater as claimed in claim 4, wherein the hot air gun assembly has a protective net fixed to and mounted around the heating hood, and has multiple protective rods arranged at evenly spaced intervals.

13. The hot air arbor heater as claimed in claim 5, wherein the hot air gun assembly has a protective net fixed to and mounted around the heating hood, and has multiple protective rods arranged at evenly spaced intervals.

14. The hot air arbor heater as claimed in claim 6, wherein the hot air gun assembly has a protective net fixed to and mounted around the heating hood, and has multiple protective rods arranged at evenly spaced intervals.

15. The hot air arbor heater as claimed in claim 7, wherein the hot air gun assembly has a protective net fixed to and mounted around the heating hood, and has multiple protective rods arranged at evenly spaced intervals.

16. The hot air arbor heater as claimed in claim 8, wherein the hot air gun assembly has a protective net fixed to and mounted around the heating hood, and has multiple protective rods arranged at evenly spaced intervals.

\* \* \* \* \*